Figure 1:
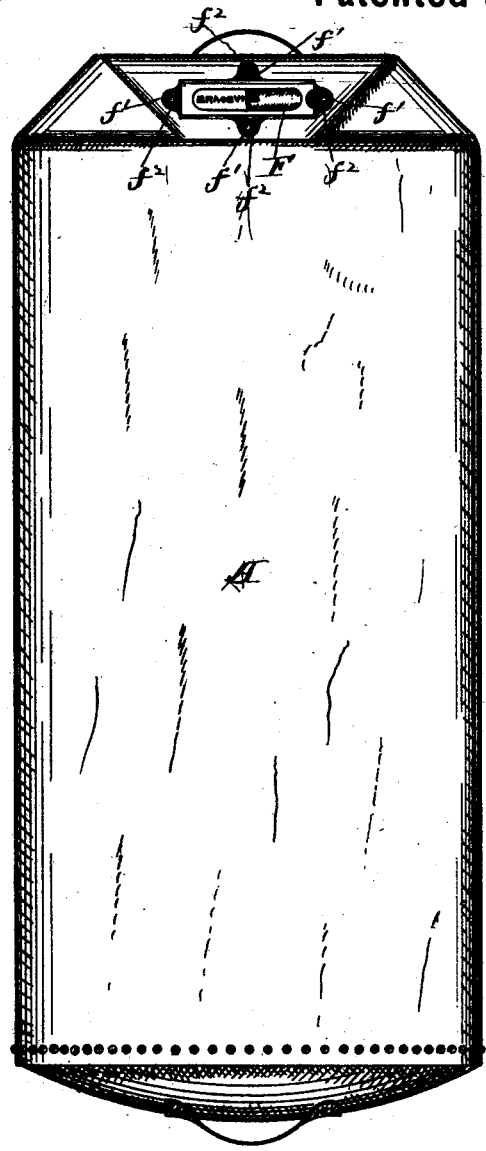

(No Model.) 4 Sheets—Sheet 1.

E. P. TEETERS.
Mail Bag.

No. 242,072. Patented May 24, 1881.

WITNESSES:
Herman Moran.
Albert L. Lawrence

INVENTOR
E. P. Teeters
B. F. A. Seyman,
ATTORNEY (No Model.) 4 Sheets—Sheet 2.

E. P. TEETERS.
Mail Bag.

No. 242,072. Patented May 24, 1881.

WITNESSES:
Herman Moran
Albert L. Lawrence

INVENTOR
E. P. Teeters.
B. F. A. Seymour,
ATTORNEY (No Model.)  4 Sheets—Sheet 3.

E. P. TEETERS.
Mail Bag.

No. 242,072.  Patented May 24, 1881.

WITNESSES:
Herman Moran
Albert L. Lawrence

INVENTOR
E. P. Teeters.
By H. A. Seymour,
ATTORNEY (No Model.) 4 Sheets—Sheet 4.

E. P. TEETERS.
Mail Bag.

No. 242,072. Patented May 24, 1881.

WITNESSES:
Herman Moran.
Albert L. Lawrence.

INVENTOR
E. P. Teeters.
By H. A. Seymour.
ATTORNEY

UNITED STATES PATENT OFFICE.

ELISHA P. TEETERS, OF ALLIANCE, OHIO.

MAIL-BAG.

SPECIFICATION forming part of Letters Patent No. 242,072, dated May 24, 1881.

Application filed April 9, 1881. (No model.)

*To all whom it may concern:*

Be it known that I, ELISHA P. TEETERS, of Alliance, in the county of Stark and State of Ohio, have invented certain new and useful Improvements in Mail-Bags; and I do hereby declare the following to be a full, clear, and exact description of the invention, such as will enable others skilled in the art to which it pertains to make and use it, reference being had to the accompanying drawings, which form part of this specification.

My invention relates to an improvement in mail-bags.

Heretofore mail-bags have ordinarily been made with a flap, which folds over the open end of the bag, the flap being secured in place by means of a securing-strap which is passed through a series of staples, and the end of the strap secured by a padlock. This construction of mail-bag has been found open to serious objections on account of the time and trouble required in locking and unlocking the bag.

Again, I am aware that a mail-bag has been made with its open end cut in such a manner that it may be folded over and secured by a padlock inserted through a single staple. In this latter construction of bag its end, when fastened, is made up of eight or ten thicknesses of the bag, and hence presents a thick, cumbersome mass of leather requiring a long staple, which receives the entire strain and is liable to become detached or torn from the bag.

The object of my invention is to obviate the defects and objectionable features hereinbefore set forth, and provide mail-bags of such form and construction that their open ends may be quickly and easily locked or unlocked, as desired, and one that is simple and durable in construction and adapted to be produced at small initial cost.

With these ends in view my invention consists in a mail-bag having its open end adapted to be folded at its corners and secured to two staples attached to the open end of the bag.

My invention further consists in a mail-bag having a lock permanently secured to its flap, the upper end of the bag adapted to be folded at its corners over two staples, and the latter secured to the bolts of the lock.

My invention further consists in certain other features of construction and combinations of parts, as will hereinafter be described, and pointed out in the claims.

Figure 4:
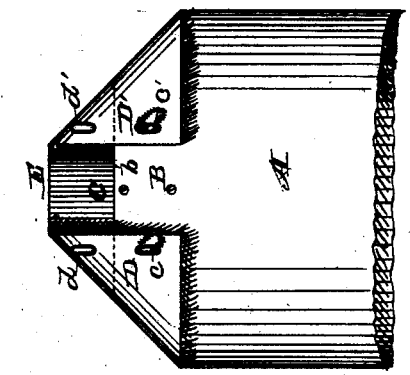
Figure 3:
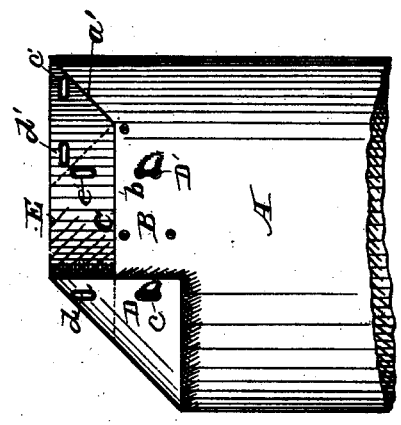
Figure 2:
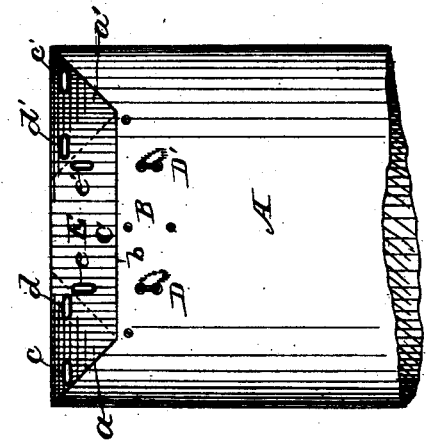
Figure 6:
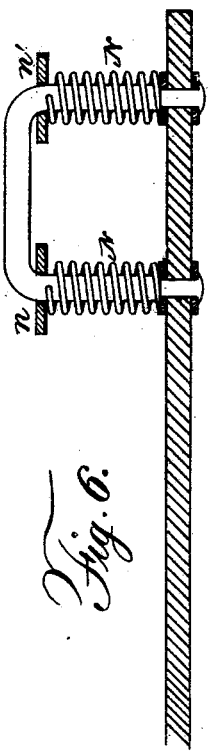
Figure 5:
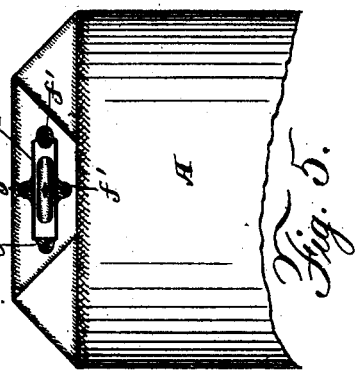
Figure 7:
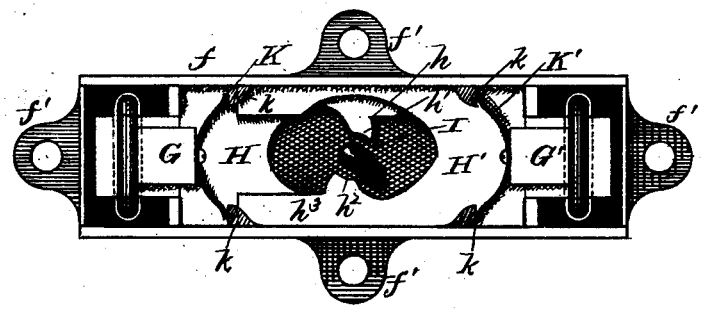
Figure 8:
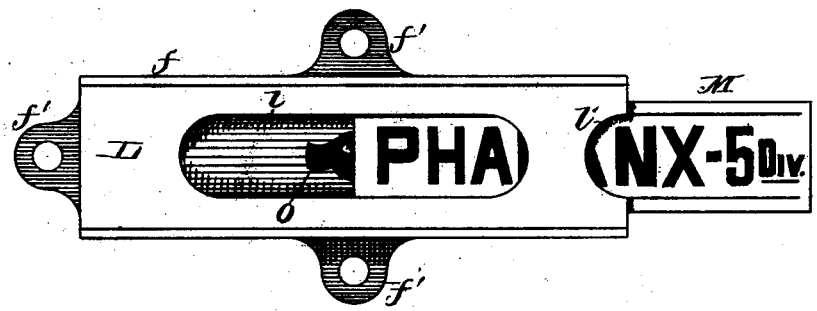
Figure 9:
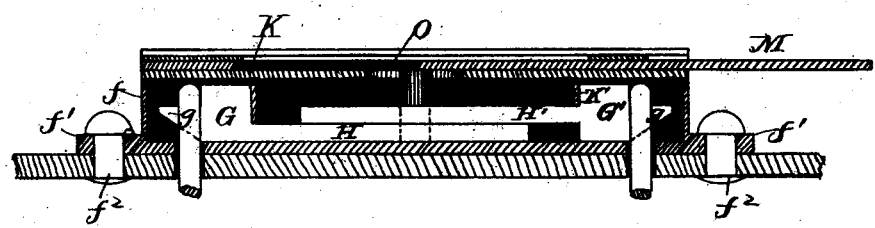
Figure 11:
Figure 10:
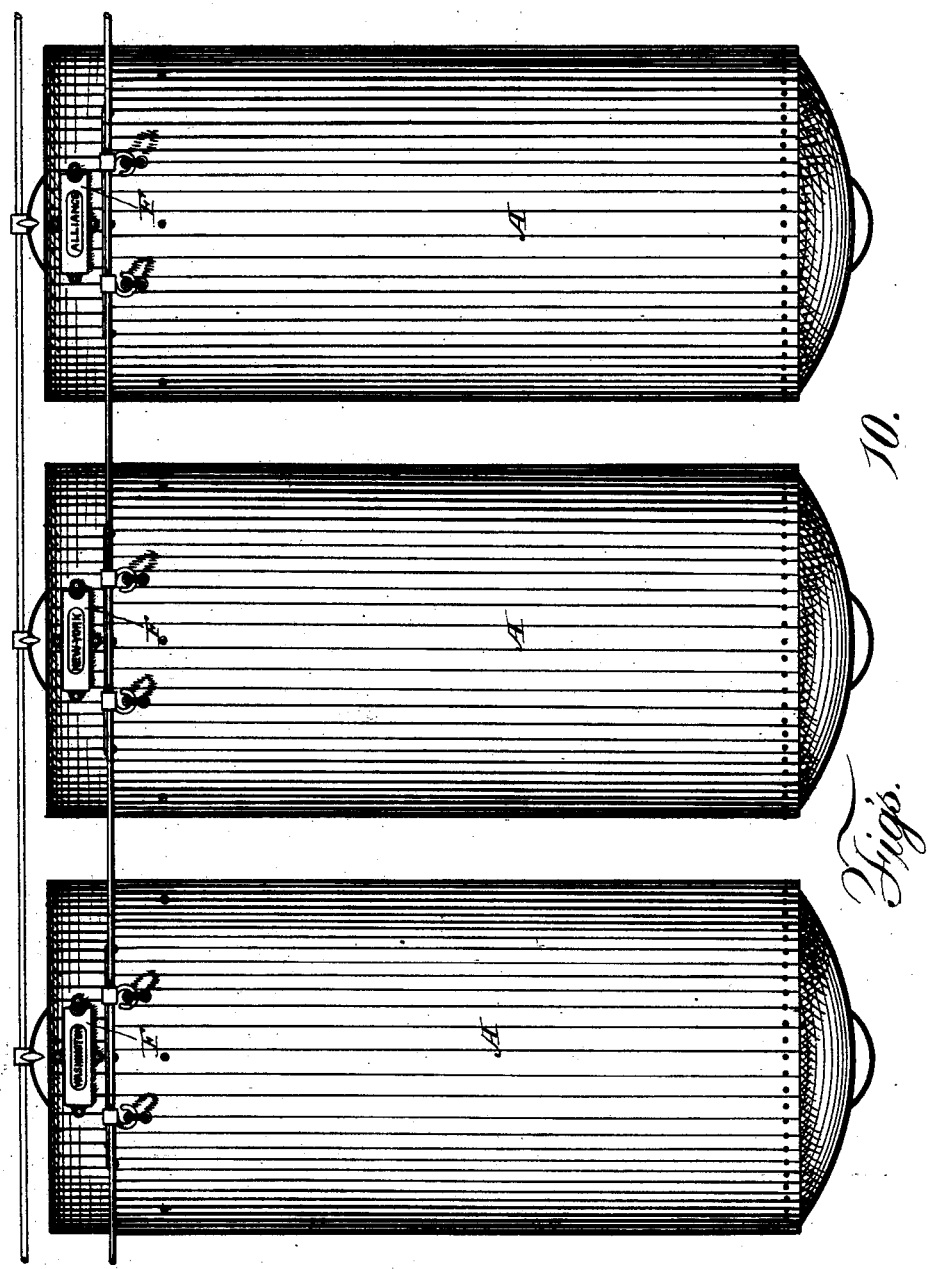

In the accompanying drawings, Figure 1 is a view in side elevation of my improved mail-bag and lock, the bag being locked. Fig. 2 is a view in side elevation of the upper end of the mail-bag, showing it in its open condition. Fig. 3 is a similar view, showing one corner folded over the staple. Fig. 4 is a similar view, showing both corners folded. Fig. 5 is a similar view, showing both corners and the flap folded and locked. Fig. 6 is a detached view of the staple with releasing-springs attached thereto. Fig. 7 is a rear plan view of the lock. Fig. 8 is a front plan view, showing the label partly removed. Fig. 9 is a longitudinal vertical section of the lock. Fig. 10 is a view in side elevation of several of the mail-bags suspended from a rack, and Fig. 11 represents the key.

A represents the mail-bag, which may be made of leather or canvas, as desired, though leather is preferable and ordinarily used. At the open end of the bag the side B thereof is cut shorter than the side C, the upper edge of the side B being cut away at an incline on its opposite ends, as at $a$ $a'$, and straight across, as at $b$. Staples D D' are firmly secured to the side B, and are located near each end of the straight portion $b$. That portion of the side C that extends above the side B constitutes a flap, E, in which are formed the horizontal eyelets or slots $c$ $c'$, which are located near the opposite edges of the flap. The flap is also furnished with two horizontal eyelets or slots, $d$ $d'$, and the vertical slots or eyelets $e e'$, the latter being located in line with the staples D D' and the slots $d$ $d'$ in close proximity to the slots $e$ $e'$.

To the rear or outer surface of the flap E is permanently secured a lock, F. This lock may be secured in any desired manner. In the present instance I have shown the lock having its case $f$ provided with perforated flanges or lugs $f'$, which are fastened to the bag by rivets $f^2$. Lock F is provided with the oppositely-moving bolts G G', having their outer ends beveled, as at $g$. Bolts G G' are provided with yokes H H', the yoke H having its arm $h$ provided with a projection, $h'$, and the yoke H' having a projection, $h^2$, on its arm $h^3$.

A central stationary stud or standard, I, is rigidly secured to the lock-case and adapted to receive the barrel J of the key, which latter is provided with the two arms $j\ j'$, which engage with the projections $h'\ h^2$, and when the key is rotated the sliding bolts are retracted simultaneously.

Springs K K' are secured to the sliding bolts, and are supported at their ends on projections $k$ formed on the lock-case. The springs serve to force the sliding bolts outward, while, as heretofore stated, the bolts are retracted by means of the key.

The upper face of the lock-casing is provided with a plate, L, having an elongated slot, $l$, and a thumb-slot, $l'$, formed therein.

$m$ is a label having the name of the place to which the bag is destined marked thereon. This label is inserted between the lock-casing and plate L, and held therein by its frictional contact with said parts, the lock-casing being made slightly convex in order to slightly spring the label and prevent its accidental displacement.

The staples D D' are provided with spiral springs N N, upon which are placed the washers $n\ n'$, for a purpose hereinafter described.

Having described the construction and arrangement of parts, I will now briefly describe the operation of locking and unlocking the bag.

The opposite corners of the upper and open end of the bag are folded over, as shown in Figs. 2, 3, and 4, the staples D D' being inserted in the slots or eyelets $c\ c'$. The flap E is then folded over, as shown in Fig. 5, whereby the slots $d\ e$ and $d'\ e'$ are made to register with each other, and when folded receive the staples D D', allowing the latter to pass into the openings in the opposite ends of the lower or bottom plate of the lock, and impinge against the beveled ends of the sliding bolts, retracting the latter until the staples have passed the bolts, when the latter are thrown outward by their springs through the staples, thereby firmly securing the latter to the lock. The proper label is then inserted, and when in place conceals the key-hole O.

To unlock the bag the label is partly withdrawn, the key inserted, partly rotated, and serves to retract the bolts, allowing the spiral springs on the staples to force the folded ends of the bag therefrom.

When the bags are suspended from a rack by the bag-handles P, as illustrated in Fig. 10, the flaps E are turned in so that the labels on each bag will be in full view of the postal clerk, for his assistance in properly assorting the mail-matter.

It will be observed that only three thicknesses of the bag are placed on the staples D D', and the latter are made comparatively sharp, and but slight strain is exerted thereon. Again, by folding the bag in the manner shown and described, a short flap is sufficient to make a complete fastening. This is an important feature, as in the case of a bag where the flap is folded at its corners and then folded down so as to be secured by a single staple. The bags, to be of ordinary carrying capacity, must be made considerably longer than the ordinary bags, and this increased length calls for undue expense in material and labor in the manufacture of the bags.

It is evident that slight changes in the construction and arrangement of the lock and particular form of the bag might be resorted to without involving a departure from my invention, and hence I would have it understood that I do not restrict myself to the exact construction of parts shown and described; but, Having fully described my invention, what I claim as new, and desire to secure by Letters Patent, is—

1. A mail-bag provided with staples, and constructed with a flap adapted to be folded at its corners and attached to separate staples, and the central portion of the flap folded down and attached to both staples, substantially as set forth.

2. A mail-bag having one side cut shorter than the other, the upper edge of the shorter side being inclined at opposite ends, the shorter side having staples secured thereto, and the longer side or flap being provided with two vertical and four horizontal slots or eyelets, substantially as set forth.

3. In a mail-bag, the combination, with the flap having vertical and horizontal eyelets formed therein, of staples provided with springs and washers, substantially as set forth.

4. In a mail-bag, the combination, with the flap having a lock permanently secured thereto, said flap provided with vertical and horizontal slots or eyelets and adapted to be folded at its corners and central portion, of staples attached to the short side of the bag near its open end, said staples adapted to receive the folded portions of the flap and engage with the bolts of the lock, substantially as set forth.

5. A mail-bag provided with a flap having horizontal and vertical slots formed therein and a lock permanently secured thereto, and two staples secured to the short side of the bag, said flap being adapted to have its corners and central portion folded over and secured upon the staples and the latter secured to the lock, substantially as set forth.

In testimony that I claim the foregoing I have hereunto set my hand this 5th day of April, 1881.

ELISHA P. TEETERS.

Witnesses:
A. W. BRIGHT,
HERMAN MORAN.